Figure 1:
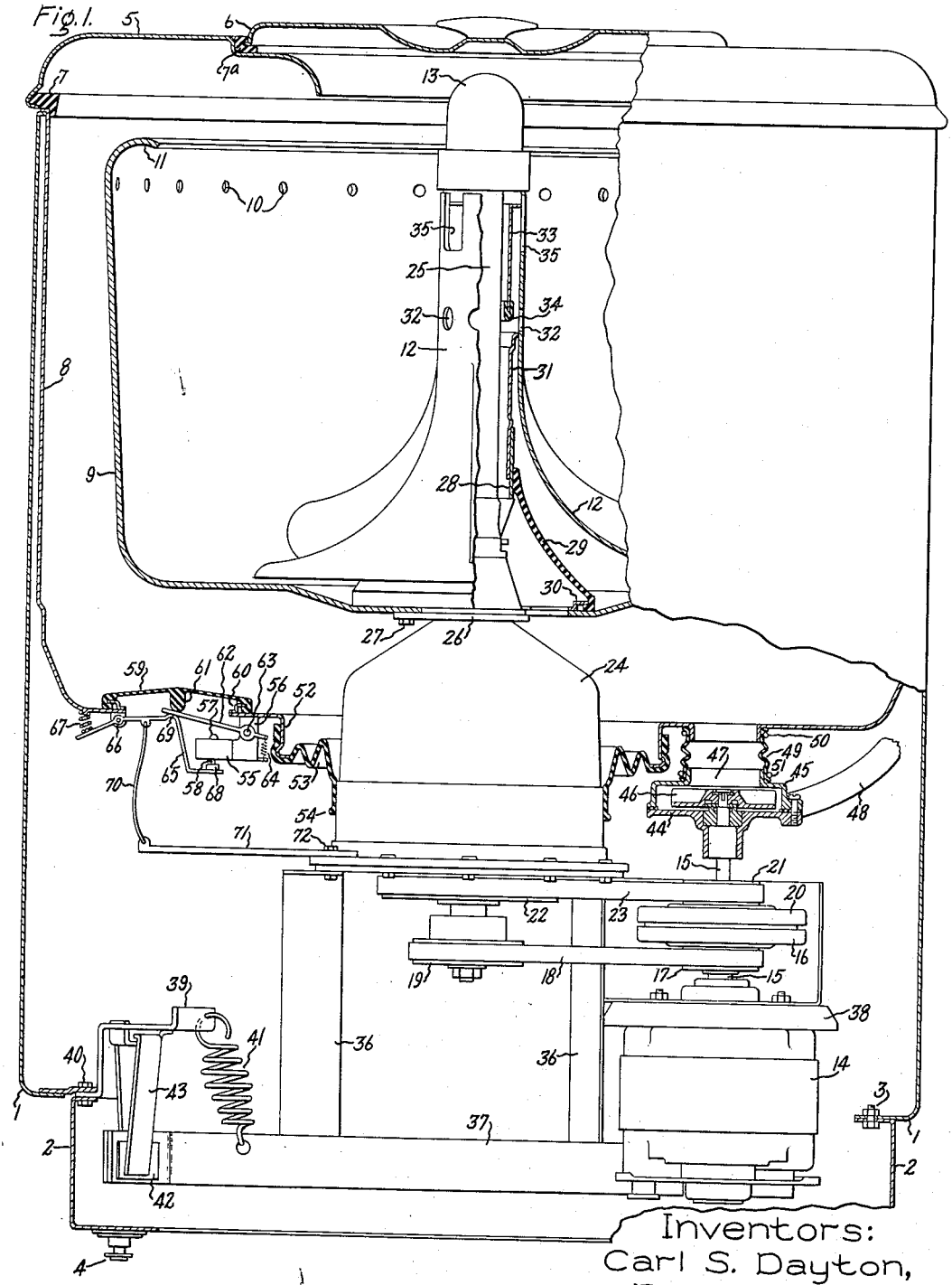

Jan. 22, 1957

C. S. DAYTON ET AL 2,778,212

WATER LOAD RESPONSIVE DIAPHRAGM OPERATED
CONTROL DEVICE FOR CLOTHES WASHERS

Filed Jan. 21, 1953

4 Sheets-Sheet 2

Inventors:
Carl S. Dayton,
David L. Clark,
by *Sheridan W. Briss*
Their Attorney.

Fig. 6.

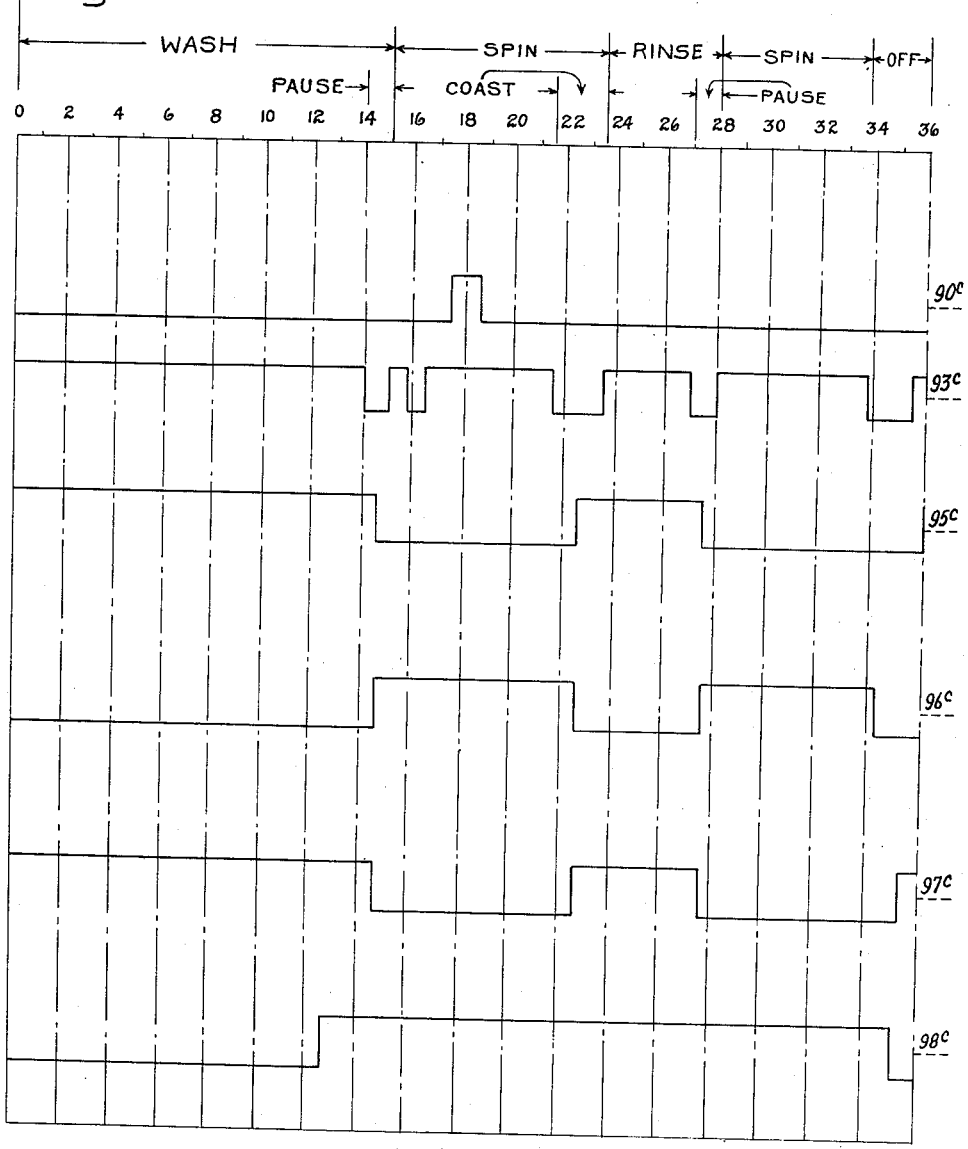

United States Patent Office 2,778,212
Patented Jan. 22, 1957

2,778,212

WATER LOAD RESPONSIVE DIAPHRAGM OPERATED CONTROL DEVICE FOR CLOTHES WASHERS

Carl S. Dayton, Louisville, and David L. Clark, Buechel, Ky., assignors to General Electric Company, a corporation of New York Application January 21, 1953, Serial No. 332,435

10 Claims. (Cl. 68—12)

This invention relates to automatic washing machines, such as clothes washers, and is directed more particularly to an improved system and mechanism for controlling the sequence of operations.

Broadly speaking, automatic clothes washers operate either on the "time fill" principle, or with a positive water level control. For "time fill" machines, a timer motor controls the length of time the water valve is open, while an automatic flow regulator controls the volume of water entering the machine per unit of time regardless of water pressure. The primary disadvantage of such a control is the relatively high first cost and the inability of the flow regulator to maintain a constant rate of flow over very wide pressure ranges encountered in practice. With the positive water level control system, both the timer and the main drive mechanism are de-energized during a filling operation. Washing liquid enters the machine at any convenient rate and continues until such time as a water level operated control switch closes the water inlet valve and energizes a control timing motor and the main driving mechanism. In other words, with the positive fill principle of operation, the sequence of washing and drying action does not commence until the proper level of washing liquid is in the machine, regardless of the time taken for the filling operation.

A typical operational cycle for a machine utilizing the positive fill action may be described as follows. When the manual control is switched to the "on" position, water enters the machine and continues flowing into the wash basket until the desired water level is reached. During this fill period both the drive mechanism and the timer motor are inoperative. Also, during the fill period, an appropriate quantity of soap or detergent may be added. When the desired level of water is obtained in the wash basket, a water level operated switch is actuated to close the water inlet means and simultaneously render the washing means effective. Typically, the washing means comprises an appropriate agitator driven with a reciprocatory or oscillatory motion; or the wash basket itself may be driven at a washing speed. Following the washing action, the entire basket is made to spin at a high speed to extract the soapy water from the clothes. The discharged water is pumped to an appropriate drain in the usual manner. However, if the operator inadvertently added too much soap at the beginning of the wash cycle, a so-called "suds-lock" condition may prevail, with the large quantity of soap suds surrounding the spinning basket preventing attainment of proper spin speed. The presence of a large quantity of soap suds around the basket may also render the discharge pump ineffective. Normally the next operation in the sequence calls for refilling the basket for a power rinse; and again the level of water within the basket is intended to control the cessation of the fill period and the beginning of a rinse agitation period. However, if there has been a "suds-lock," the water level switch may indicate that the machine is ready for agitation when in fact the wash basket is substantially empty. Under these conditions producing dry agitation, there is substantial risk of imposing undue wear on the clothes or tearing the clothes.

Correspondingly, it is an object of this invention to provide a control operating on the positive water level fill principle, which is sensitive not only to apparent water level, but also to the weight of the wash basket contents.

It is also an object of this invention to control the filling of a washing machine and the operation of the driving mechanism in a manner which will prevent positively a "dry-agitate" condition, and which further will reduce materially the possibility of the "suds-lock" condition.

Another object of this invention is to simplify the control system and controlled components for a washing machine, while improving reliability, thereby to supply a more reliable machine at less cost to the purchaser.

In accomplishment of the foregoing objectives of this invention, as embodied in an automatic clothes washer of the type having a rotatable wash basket mounted within an enclosing tub, the basket is spring suspended with respect to the tub and receives the wash liquid and items to be washed. At one or more times during the complete cycle of operations, the basket is filled with washing liquid up to an overflow level, the overflow discharging into the tub. A water level switch is mounted on the relatively rigid tub, and normally is biased to an inoperative position regardless of water level within the tub. This bias is removed, responsive to the weight of the basket contents, by the relative movement between the spring suspended basket and the tub. This is accomplished through a flexible connection from the basket assembly to the switch. When the switch bias has been removed by the weight of the washing liquid in the basket, the switch is enabled to sense the presence of overflow liquid in the tub and thereby close the water fill valve and commence operation of the timer and drive mechanism. Furthermore, the water level switch is prevented from resetting to its initial position until the basket is substantially empty, thus permitting use of a bi-directional discharge pump operated from the drive mechanism. Hence, at the beginning of any spin cycle, the tub is empty, ready to receive the volume of water in the wash basket.

Figure 2:
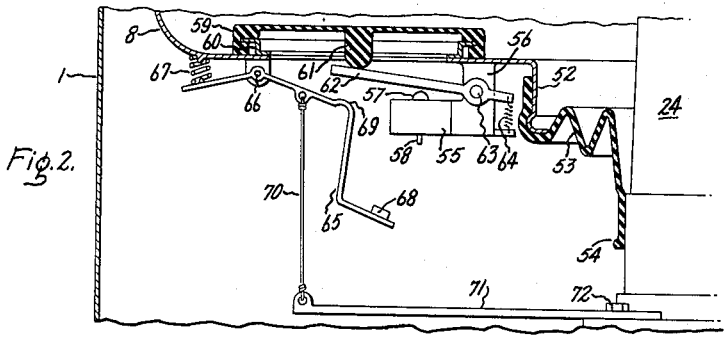
Figure 3:
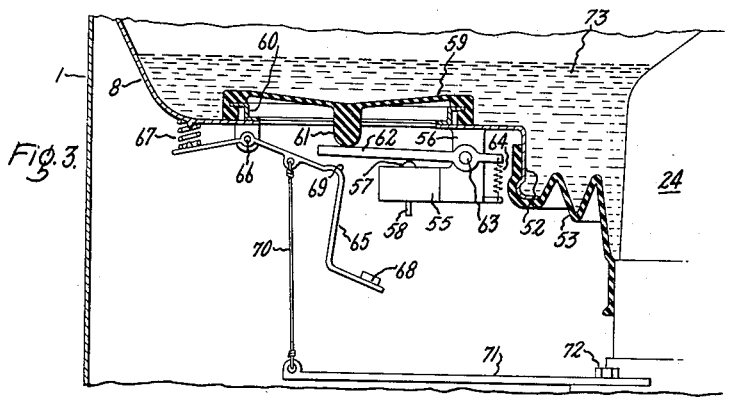
Figure 4:
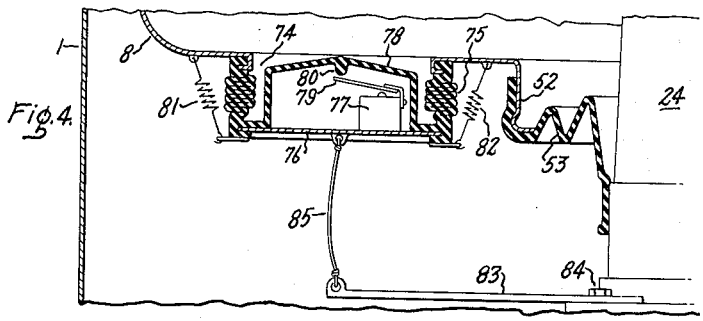
Figure 5:
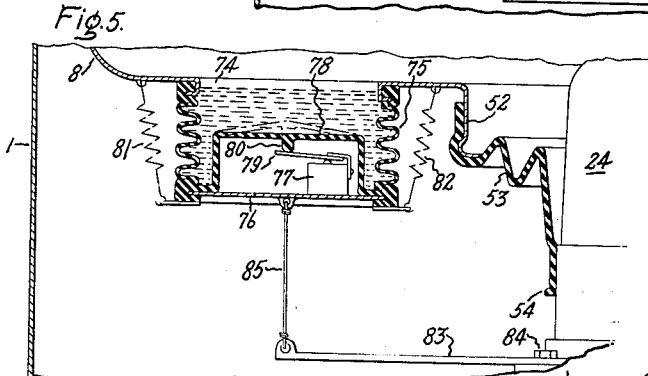
Figure 6:
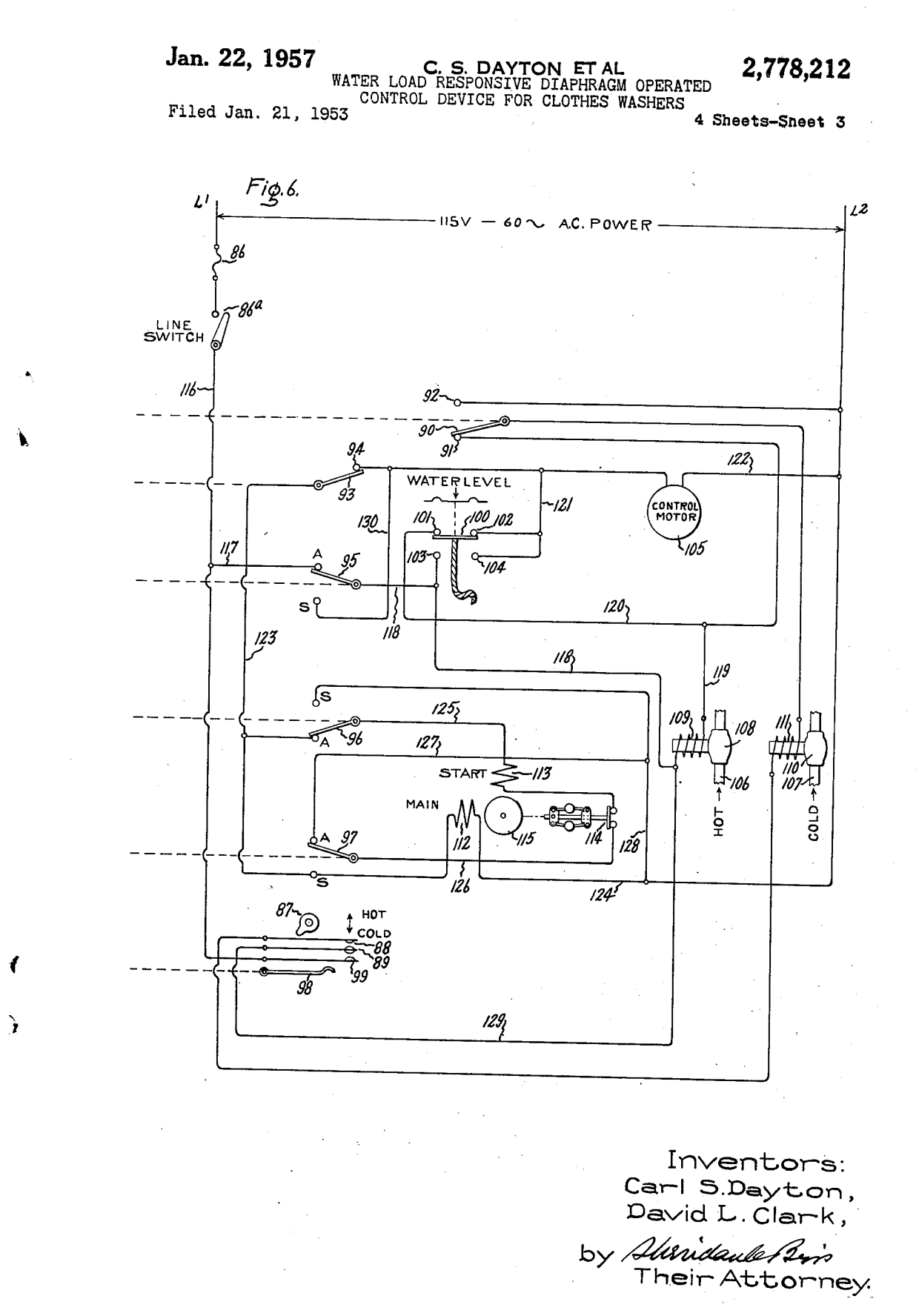

The features of our invention which we believe to be nover are set forth with particularity in the appended claims. Our invention, itself, however, both as to its organization and method of operation, together with further objects and advantages thereof, may best be understood by reference to the following description taken in connection with the accompanying drawings, in which Fig. 1 is a side elevation, partially in section, with portions broken away to indicate interior construction of a clothes washer embodying our invention; Fig. 2 is an enlarged sectional elevation of a portion of the machine shown by Fig. 1 in a different operative position; Fig. 3 is a sectional elevation similar to Fig. 2 in a further operative position; Fig. 4 is a sectional elevation of a modified form of the device shown by Figs. 2 and 3; Fig. 5 is a sectional elevation of the modification shown by Fig. 4 in a different operative position; Fig. 6 is a schematic wiring diagram of a control system applicable to practice of this invention; and Fig. 7 is a developed cam layout to illustrate the positions of the various switches shown by Fig. 6 for the desired sequence of operations.

Referring now to the drawings, Fig. 1 illustrates an automatic clothes washer of typical exterior construction comprising an outer casing or housing 1 carried on a supporting base 2. The base and casing may be secured rigidly together in a conventional manner by a plurality of bolts 3 extending through respective mating flanges. The base member 2 normally is provided with a plurality of supporting feet 4, which preferably are adjustable to permit the machine to be leveled even though placed on an uneven surface. A cover 5 including a lid 6, extend over the upper open end of the casing to complete the enclosure, with suitable resilient grommets 7 and 7a interposed between respective mating edges to damp vibration and insure quiet operation. By means of a flanged and preferably welded connection, a tub assembly 8 is carried directly by outer casing 1, being supported from the upper edge of the casing as shown.

Within tub 8 we have shown a wash basket 9, which is of generally cylindrical shape and substantially imperforate except for a plurality of drain holes 10 adjacent the upper basket edge. As shown, the basket sidewall diverges outwardly a slight amount from bottom to top, so that when the basket is rotated at high speed, liquid contained within the basket moves upwardly along the sidewall to overflow through apertures 10. To prevent clothes or articles within the basket from being thrown out, the upper edge thereof is rolled inwardly as at 11. To impart washing action, a multi-bladed agitator 12 is positioned within basket 9 and is held in position by a top cap 13. The basket and agitator are driven utilizing a reversible electrical motor 14 as a power source. The motor shaft 15 drives a bidirectional clutch, for example, of the type shown by the copending application of Jacob W. McNairy, Serial No. 164,427, filed May 28, 1950, now Patent No. 2,639,794, and assigned to the General Electrical Company, assignee of the present invention. Briefly, when the motor rotates in one direction, the lower half 16 of the clutch member drives pulley 17, which is connected by belt 18 to the agitation pulley 19 of the drive mechanism; whereas reverse rotation of the driving motor through the upper clutch member 20 drives pulley 21 to rotate spin pulley 22 through belt 23. Suitable drive mechanism for agitator 12 and basket 9 is contained within a gear case 24. This mechanism may take the form as disclosed by U. S. Patent 2,462,657, issued to Jacob W. McNairy on February 22, 1949, and assigned to the General Electric Company, assignee of this invention. As disclosed in the aforesaid McNairy application and patent, when pulley 19 is driven, agitator 12 is oscillated within basket 9 to impart desired motion to washing liquid within basket 9. When the drive motor is reversed to drive pulley 22, the agitator drive mechanism becomes inactive and a drive tube 25 rotates at a continuous high speed.

As shown in Fig. 1, drive tube 25 is connected by means of flange 26 and bolts 27 to basket 9, so that whenever the drive tube is rotated continuously at high speed, the basket likewise rotates for centrifugal water extraction. By frictional drag, agitator 12 likewise rotates with basket 9. It may be noted from Fig. 1 that the central post of agitator 12 is hollow. Secured to spin tube 25 is a sleeve 28, having bonded thereto a flexible boot 29 with its lower end clamped to the bottom wall of basket 9 by a plate 30. Telescopically received within sleeve 28 is a sleeve extension 31 encircling the spin tube and extending upwardly within the hollow agitator to a position directly under overflow apertures 32 in the agitator. Thus, with the parts in the position indicated in Fig. 1, when the basket fills to the level of overflow ports 32, the overflow liquid flows downwardly through the annular space between sleeves 28 and 31 and the spin tube, discharging into tube 8. If it is desired to fill basket 9 to a higher level, a load selector 33, slidable within the agitator and carrying a sealing gasket 34 on its lower edge, may be moved manually to a lower sealing position with sleeve extension 31. In this case, basket 9 is filled to the level of upper overflow ports 35.

As disclosed previously, liquid is extracted from the clothes by high speed rotation of basket 9. In view of the random distribution of clothes around the interior of the basket, this high speed rotation invariably results in vibration due to the static and dynamic unbalance. Since gear case 24 contains the bearing for and rotatably supports basket 9, it is evident that gear case 24 likewise vibrates during spin. As shown in Fig. 1, the gear case is supported on a plurality of vertical supporting members such as 36, which in turn are carried on a bottom frame 37. To prevent change in the tension of driving belts 18 and 23, we prefer to support motor 14 from the framework comprising the vertical supports 36 and bottom frame 37, for example, by a laterally extending arm 38. Bottom frame 37 is resiliently carried by base 2 by means of a plurality of supporting brackets 39 bolted to the base as at 40. While only one such bracket is indicated in Fig. 1, it is to be understood that three or more supporting brackets are distributed equi-angularly around the base of the machine to support adequately bottom frame 37. Resilient support of frame 37 with respect to the base is accomplished by means of springs 41, with one spring associated with each of the brackets 39. The spring constant is selected whereby under a no-load condition, the assembly is in the position as shown by Fig. 1, in which case the entire basket assembly, drive mechanism, and motor are resiliently supported with respect to base 2. When the wash basket contains a full load of water and clothes, a downward travel through extension of springs 41 of approximately 1 inch is desired. Friction damping means are employed with respect to this spring suspension to limit amplitude of excursions during spin. In the form shown herein, bottom frame 37 carries suitable friction pads 42, each cooperating with a spring biased yoke 43 carried by bracket 39.

For simplicity, we prefer to employ as a means for emptying tub 8 a centrifugal pump connected directly to shaft 15 of the motor. This pump comprises a lower housing 44 and cooperating upper housing 45 which together define the pump scroll. A suitable impeller 46 directly driven by shaft 15 operates to draw liquid in through the axial inlet 47 with tangential discharge through hose 48. Such a pump may be of conventional design readily available commercially. Since the pump is directly connected to the motor, it must be movably mounted with respect to tub 8 to permit relative excursion during basket vibration. This flexible interconnection of the pump with the tub is conveniently accomplished by a flexible tube 49 secured to the tub by a compression ring 50 and to the pump intake by a similar ring 51. While the pump is designed for rotation in a given direction and functions most efficiently when rotated in this direction, it is to be noted that the pump likewise produces a positive head in the same direction during reverse rotation of the driving motor. In fact, it is found in practice that such a centrifugal pump produces sufficient head on either direction of rotation to empty the contents of tub 8. Because of this it has been found necessary in the past to utilize a special one-way pump construction, for reasons that will appear later, to achieve pumping action only during the spin cycle. This invention eliminates the need for a specially designed pump.

The bottom wall of the tub must of course provide a fluid tight seal with respect to the lower portion of the casing to protect the drive motor and suspension system. As shown in Fig. 1, the bottom wall of tub 8 is apertured as indicated at 52 to receive gear case 24 with sufficient clearance to permit normal excursion during vibration. The fluid seal is provided by a flexible boot 53 suitably bonded to the flange defining aperture 52 of the tub and clamped by any suitable means (not shown) at 54 to the gear case.

Our invention is directed particularly to a means for terminating the filling operation of basket 9 when the desired water level has been achieved, and simultaneously setting in motion the drive mechanism for agitation and spinning respectively. As explained below in a discussion of the schematic wiring diagram, this function can be performed by an appropriate snap action switch 55 carried by a bracket 56 depending from the bottom wall of tub 8. For example, this switch may be a standard "Switchette" as supplied by the General Electric Company. Switch 55 may be actuated between its two positions by applying a downward force against a button 57, or an upward force against a pin 58. While it has been indicated that this is a snap action switch, it should be noted that the switch does not contain an automatic reset spring, and hence pressure must be applied either to button 57 or pin 58 to actuate the switch. Obviously, the switch must be protected from water contained within tub 8 and for this reason we employ a diaphragm 59 clamped to the bottom wall of the tub by an annular clamping bracket 60. Centrally located on the bottom side of diaphragm 59 is an extension 61, cooperating with a switch operator 62 pivoted at 63 to switch supporting bracket 56. This switch operator is biased away from button 57 by a relatively light spring 64. It is thus clear that downward pressure on flexible diaphragm 59 by the water contained within tub 8 will force the diaphragm downwardly to actuate the switch through button 57.

To prevent operation of switch 55 to its lower position when the basket is unloaded as shown in Fig. 1, a reset lever 65 is employed. Lever 65, pivoted at 66 on appropriate ears formed on tub 8, is biased into engagement with switch reset pin 58 by a compression spring 67. An insulating button 68 is provided on lever 65 to contact pin 58 and thus hold the switch in its upper position. Spring 67 is selected to provide sufficient biasing force against switch pin 58 and against switch operator 62 at point 69 to prevent the switch from being actuated to its lower position even though there is a substantial quantity of water within tub 8. To release the reset lever from the Fig. 1 position, a flexible connection, for example by a nylon cord 70, is made between the reset lever and the spring suspended basket. This is conveniently accomplished by the addition of a lateral arm 71 secured to the bottom flange of gear case 24 by the attaching bolt 72.

As explained above, when basket 9 contains a full load of water, or at least a load to the level of overflow ports 32, a downward movement of the entire basket, gear case, and supporting frame results through extension of springs 41. This downward movement of the basket with respect to the tub produces the action as illustrated by Fig. 2, wherein the flexible cord 70 has pulled reset lever 65 downward against the action of compression spring 67. By this release of the reset lever, switch 55 is now prepared for actuation by water within tub 8. Referring now to Fig. 3, there is shown the position of the components when a relatively small quantity of water 73 has overflowed from the basket into the tub. As shown, the weight of this water exerting a downward pressure on diaphragm 59 has actuated switch 55 through the medium of switch operator 62. During subsequent operation of the machine with motor 14 operating, water 73 will be pumped out by the centrifugal pump, returning this switch mechanism assembly to the position indicated by Fig. 2, wherein spring 64 exerts sufficient force to raise switch operator 62 from the switch operating button. However, as long as basket 9 is between one-quarter and one-half full of water, reset lever 65 is held away from reset pin 58. When water is spun out of basket 9 during the drying operation the entire basket assembly rises, releasing the tension on cord 70, thereby permitting the reset lever to contact pin 58 and reset the switch under the influence of compression spring 67.

Referring to Figs. 4 and 5, we have shown an alternate embodiment of our invention possessing the added advantage of requiring less overflow of water to actuate the switch. In accordance with this embodiment, a well, indicated generally at 74, is suspended from the bottom wall of tub 8. This well is defined by an extendible sidewall 75 having a generally cylindrical configuration and made up, for example, of a plurality of convolutions of a flexible rubber-like material; a bottom wall 76 for the well preferably is substantially rigid and is bonded or secured to sidewall 75 in any suitable manner. A switch 77 is carried on bottom wall 76 and is completely enclosed by a diaphragm 78, which conveniently may be formed integrally with the flexible sidewall 75, whereby an entirely moisture-proof compartment is provided for the switch. In this embodiment the switch again may be a conventional switchette, having its own internal reset spring for returning the switch to normal position when pressure is released from a switch operating arm 79. Diaphragm 78 may be provided with a central protuberance 80 in operative relation with the switch operating arm. The flexible walls of the well normally are maintained in a retracted position, for example, by tension springs 81 and 82 acting between the well base and the tub. By means of the lateral arm 83 secured to gear case 24 at 84, and flexible cord 85, the well is extended by the downward motion of the basket and drive mechanism assembly responsive to the weight of liquid in the basket. Fig. 5 illustrates this extended position. It is contemplated that the downward displacement when the basket is filled to the level of overflow ports 32 is approximately one inch. Since the well is entirely below the bottom wall of the tub, overflow water from the basket quickly fills the well; and this weight of water on diaphragm 78, when the well is extended, is sufficient to deflect the diaphragm against the switch operating arm, thereby actuating the switch. Even though the pump is operated to discharge the contents of the tub, the well remains filled until such time as the basket load is discharged or emptied to a level corresponding to one-quarter to one-half full. Thereupon the upward motion of the basket, as springs 41 contract, releases the tension from cord 85, permitting springs 81 and 82 to retract the flexible walls of the well. This contraction of the well forces most of the water from the well into the tub, and thus releases the pressure from diaphragm 78, permitting switch 77 to return to its initial position.

In the schematic wiring diagram of Fig. 6 is shown a typical example of an application of this invention to an automatic washer control system. Power is supplied to the machine in a conventional manner through lines L1 and L2 with a conventional fuse 86 in one of the lines. A manual line switch 86a is also conventional. At the beginning of a cycle, the other switches shown on this diagram are in the positions shown, with the exception possibly of a cam 87, which may be manually adjusted to open or close contacts 88 and 89, and thus permit the operator to select hot water or a mixture of hot and cold water. In other words, switch arm 90 is in the lower position against contact 91 while contact 92 is open; switch arm 93 is in the upper position against contact 94; switch 95 is on its contact A while contact S is open; switch 96 is in the lower position likewise against its contact A; switch 97 is in its upper position against its contact A; while switch operating arm 98 is in its lower position, with contact 99 open. It may be noted in connection with switches 95, 96, and 97 that we have selected the letters "A" and "S" to denote agitate and spin respectively for the purpose of clarity in description. The water level switch is shown as a double pole, double throw switch, having a movable blade 100 adapted to close a circuit through contacts 101 to 102 or from 103 to 104.

The description of operation will best be understood by reference to Figs. 6 and 7 simultaneously. For clarity, Fig. 7 represents a development of the surface of each of the six operating cams which are driven at a constant rate of speed by a control motor 105. In other words, the cam chart of Fig. 7 represents the surface of each of the cams developed along a straight line. For each cam, the lower level line represents the lower position of the corresponding switch; while the upper level line correspondingly represents the upper position of the switch. For convenience, Fig. 7 indicates the cycles of a complete washer operation which extends, for example, over a 36 minute period. For the purpose of clarity the cams are numbered 90c, 93c, 95c, 96c, 97c, 98c, corresponding to the switch operating arms 90, 93, 95, 96, 97, and 98 respectively. In Fig. 6, hot and cold water lines 106 and 107 respectively are shown as including solenoid operated valves, valve 108 being controlled by solenoid 109 in the hot water line, and valve 110 controlled by solenoid 111 in the cold water line. While not shown in Fig. 1, it will be understood that these valves may be located at any convenient position within the washer casing, with a common discharge line extending over the upper lip of the wash basket in a conventional manner. In Fig. 6 the motor 14 is represented by a main winding 112, a start winding 113, a centrifugally operated switch 114 and a rotor 115.

With all of the switches in the position shown by Fig. 6 at the beginning of a cycle, closure of line switch 86a completes a circuit through lines 116, 117, switch 95, line 118, hot water solenoid 109, line 119, line 120, contacts 101 and 102 of the water level switch to line 121. From line 121 current flow divides with a portion passing through control motor 105 and line 122 to L2; while the other path is through switch 93, line 123, through parallel paths through the main and start windings of the drive motor, line 124 to L2. If it is desired to admit a mixture of hot and cold water, i. e. warm water, to the machine, then contacts 88 and 89 are closed by the manually operated cam 87 so as to energize the cold water solenoid 111 in parallel with the hot water solenoid 109 through line 129 and contact 91 of switch 90. Since the impedance of either or both of the water valve solenoids greatly exceeds the impedance of the drive motor, the valves are actuated to admit water to the machine; while insufficient current flows through either the drive motor or the control motor to permit their operation while in such series circuit relation with the water valve solenoids. Hence the operating mechanism of the machine and the control motor remain inactive as long as the water level switch is in the upper position against contacts 101 and 102.

As explained in connection with either the embodiment of Figs. 2 and 3 or the embodiment of Figs. 4 and 5, the water level switch is conditioned for operation by the downward motion of the spring suspended basket as it is filled with water. The actual operation of the water level switch cannot occur, however, until water overflows from the basket into the tub to depress the switch operating diaphragm. Referring now to the wiring diagram, when the water level switch armature closes the circuits through contacts 103 and 104, the voltage across either or both of the water valve solenoids is removed; and a drive circuit is completed as follows: line 116, line 117, switch 95, line 118, contacts 103 and 104, line 121, switch arm 93, line 123, main winding 112 and line 124 to L2; with a parallel start circuit from line 123, comprising switch arm 96, line 125, start winding 113, centrifugal switch 114, line 126, switch arm 97, line 127 and line 128 to L2. In the usual manner, the circuit through the start winding is opened by the centrifugal switch mechanism as soon as the motor has come up to speed. Control motor 105 is supplied with full line voltage through the water level switch as indicated, thereby driving the cams at a constant speed. As long as the switches remain in these positions, agitator 12 is driven through the drive mechanism with an oscillatory motion.

After approximately 12½ minutes of operation, cam 98C raises arm 98 to close contacts 88, 89 and 99 to thereby condition the control for remaining cycles of operation. After approximately 14 minutes, cam 93c has a depression which opens switch 93 effectively removing the power from the main motor and enforcing a pause period while the control motor continues to run. During this pause period cams 95c, 96c and 97c reverse the positions of respective switches 95, 96 and 97 to ready the machine for the spin operation. When switch 93, under the influence of cam 93c, is again raised to close the circuit, the drive motor reverses through the following circuit: line 116, contact 99, contact 89, line 129, line 118, switch arm 95 (now on contact S), line 130, switch 93, line 123, main winding 112 and line 124 to L2. Since switches 96 and 97 are both in the S position, the parallel circuit to the start winding is completed from line 123, switch 97, line 126, the centrifugal switch, start winding 113, line 125, switch 96, line 128 to L2. Thus it will be noted that current flow through the start winding has been reversed thus causing the motor to operate in the spin direction.

At this point, it may be recalled from the above description that the drain pump was running continuously, disposing of any overflow water in tub 8. However, the water level switch remained in its lower position throughout the first 15 minutes of operation, since the weight of the filled basket has prevented the switch from resetting to its upper position. Hence, at the beginning of the first spin cycle there is substantially no residual water within the tub. As the first spin cycle is commenced, soapy wash water is thrown from the basket into the tub, and hence the pump is immediately loaded with a large quantity of soap suds. For this reason, at the beginning of spin, commencing at approximately the 15 minute point on the cam chart, we prefer to energize the motor only for a short period of time, for example 45 seconds, followed by a short pause of another 45 seconds, before resuming the high speed spin. This control function is performed by cam 93c and switch 93. Such action permits the suds to flow down the outer sidewalls of the basket into the tub, to avoid if possible the "suds lock" condition, in which the drag of the suds prevents proper acceleration of the basket. In addition, during an early portion of the high speed spin, cam 90c raises switch arm 90 into contact with 92 thereby completing a circuit through the cold water solenoid, thus spraying cold water into the machine to quickly kill any suds remaining. In spite of all these precautions it is still found that occasionally a serious "suds lock" condition will prevail, preventing the machine from reaching a full spin speed, although the speed may be sufficient to spin most of the water out of basket 9. Also, with a large quantity of suds in the outer tub, the pump may be unable to completely empty the tub prior to the beginning of the next agitation period. Hence, if the water level switch were responsive merely to the presence of liquid within the outer tub, the machine might commence agitation without refilling the wash basket, resulting in torn or excessively worn clothes. However, as explained above, the water level switch construction, as disclosed herein, requires that two conditions must be met before agitation can commence. First, the basket must be at least in the range of one-quarter to one-half full in order to condition the water level switch for operation; and second, there must be sufficient overflow of water in the outer tub to depress the switch operating diaphragm. Hence, even under the worst conditions of "suds lock," the basket must be at least one-quarter full before rinse agitation can commence. The dry agitate condition has been positively avoided and prevented.

Resuming the description of the complete operational cycle, the machine continues to spin to a point just short of 22 minutes as measured from the beginning of rotation of the cams. At this point switch 93 is opened by its cam 93c for a period of approximately two minutes to allow the spin basket to coast to a standstill. During this pause, switches 95, 96 and 97 are again placed in the "A" or agitation position by their respective cams. In normal operation, the water level switch moves to its upper position during the spin cycle, so that when switch 93 again closes, the water valves are opened by their respective solenoids in the manner previously indicated. During this fill period also, neither the control motor nor the drive motor are operative. It may also be noted that closure of contacts 88 and 89 by switch arm 98 has effectively placed both hot and cold water solenoids in parallel whereby the rinse fill always is a mixture of hot and cold water. The rinse agitation continues until the 27 minute point, whereupon opening of switch 93 by cam 93c enforces a one minute pause, while the contacts are made ready for the final spin operation by reversal of the positions of switches 95, 96, and 97 to their "S" spin positions. Thus, when switch 93 again closes at the 28 minute point, the clothes are spun dry with an approximately six minute spin period. The cycle automatically terminates itself and is made ready for the next cycle of operations as indicated on the cam chart. To commence a new cycle of operations, it is necessary to rotate the cam assembly slightly, for example by a suitable manual knob or dial (not shown), in a well known manner.

From the above description, it may be seen that we have provided a control which positively prevents dry agitation during the rinse period by use of a water level switch, which must first be readied for operation by the weight of a substantially filled wash basket, and finally is actuated to commence power agitation under the influence of overflow water in the outer tub. Furthermore, with a water level switch as herein disclosed, the contents of the outer tub may be pumped therefrom continuously, whereby the tub is substantially empty at the beginning of a spin cycle; and this may be done without causing resetting of the water fill switch which would otherwise cause agitation to cease while the machine again refilled. In addition, with a control as herein disclosed, the risk of a control malfunction signaling for agitation while the basket is spinning at high speed is materially reduced, since two separate conditions of the water level switch must be met for agitation. Serious damage to the drive mechanism would result of course if the control called for agitation while the basket was spinning at high speed.

While the present invention has been described by reference to particular embodiments thereof, it is to be understood that numerous modifications may be made by those skilled in the art without actually departing from the invention. We, therefore, aim in the appended claims to cover all such equivalent variations as come within the true spirit and scope of the invention.

What we claim as new and desire to secure by Letters Patent of the United States is:

1. In a washing machine of the type having a fixed outer tub, a substantially imperforate wash basket within said tub and including washing means therein, a drive mechanism operable to drive said washing means and to rotate said basket, means resiliently supporting said basket relative to said tub, water fill means discharging into said basket, overflow means discharging from said basket into said tub, and control means sequentially operating said fill means and said drive mechanism comprising a manually controlled switch for said fill means and drive mechanism, a water level switch carried by said tub and having a first position rendering said water fill means effective and a second position de-energizing said water fill means and energizing said drive mechanism following operation of said manual switch, resilient means normally biasing said water level switch to said first position regardless of water level within said tub, a flexible connection between said last named resilient means and said resiliently supported basket operable responsive to weight of said basket and basket contents to counteract the biasing force on said switch, and a water level switch actuator oriented with respect to said tub to sense the quantity of overflow liquid therein, whereby said water level switch operates to said second position responsive both to weight of the contents of said basket and to water level within said tub.

2. In a washing machine of the type having a rigid frame, a wash basket with means for providing washing action of clothes placed therein, a tub carried by said frame enclosing said wash basket, a drive mechanism for imparting motion to said basket, water inlet means discharging into said basket, and a control system scheduling operation of said drive mechanism, that improvement in means for rendering said control system effective dependent upon water level in said basket comprising, a water overflow port discharging from said basket into said tub, water level sensing means within said tub, a spring suspension for said basket relative to said tub, a switch mechanism carried by said tub, a flexible connection between said spring suspended basket and said switch mechanism to prepare said switch mechanism for operation, and an actuator for said switch mechanism operated by said water level sensing means.

3. A control system for an automatic washing machine of the type having a wash basket suspended within an outer tub comprising a timer, a plurality of cam means driven by said timer, control switches operated by said cams, a water level switch controlling energization of said timer, means responsive to the weight of the contents of said basket for preparing said water level switch for operation, and means for thereafter operating said water level switch in response to a predetermined level of overflow water in said tub.

4. In a clothes washer, a frame, a wash basket spring suspended with respect to said frame, a tub fixed to said frame and encompassing said basket, a drive and basket fill mechanism with control means therefor to provide washing action in said basket, and liquid responsive switch means to render said mechanism and control means effective for washer operation, said switch means comprising a switch having a first position limiting said mechanism to filling with washing liquid and a second position rendering said control means effective for the washing cycle, a switch trip arm, flexible diaphragm means within said tub to actuate said trip arm responsive to liquid level in said tub, thereby to move said switch from said first position to said second position, and means resetting said switch upon upward movement of said suspended load responisve to loss of water therefrom.

5. In a clothes washer, a frame, a wash basket spring suspended with respect to said frame, a tub fixed to said frame and encompassing said basket, a drive and basket fill mechanism with control means therefor to provide washing action in said basket, and liquid responsive switch means to render said mechanism and control means effective for washer operation, said switch means comprising a switch having a first position limiting said mechanism to filling with washing liquid and a second position rendering said control means effective for the washing cycle, a switch trip arm, flexible diaphragm means within said tub to actuate said trip arm responsive to liquid level in said tub, thereby to move said switch from said first position to said second position, a switch reset arm pivotally mounted on said tub and resiliently biased to reset said switch, and a flexible cord interconnecting said reset arm with said suspended load to free said switch for operation from said first position to said second position, said switch being reset only upon upward movement of said suspended load responsive to loss of water therefrom.

6. In a washing machine of the type having a rigid frame, a tub carried by said frame, a wash basket resiliently suspended with respect to said tub with means in said basket providing washing action, a drive mechanism for said basket and washing means, water inlet means discharging into said basket, and a control system scheduling operation of said drive mechanism, that improvement in means for rendering said control system effective dependent upon water level in said basket comprising, a water overflow port from said basket into said tub, a well depending from the bottom wall of said tub and having extendible side walls, means biasing the side walls of said well to a contracted position, means interconnecting the bottom wall of said well to said spring suspended basket thereby to extend said well responsive to the weight of liquid in said basket, a diaphragm operated switch within said well arranged for operation in response to the head of liquid in said well when said side walls are extended, and circuit means including said switch for terminating said filling operation and rendering said control system effective upon operation of said switch.

7. In a washing machine, an outer enclosing tub, a rotatable wash basket within said tub including agitation means therein, a drive mechanism for said basket, means resiliently supporting said basket with respect to said tub, liquid filling means for said basket, an overflow port discharging from said basket into said tub, means emptying said tub continuously during washer operation, a flexible walled well depending from the bottom wall of said tub, means biasing said well to a contracted position, means extending said well and overcoming said bias responsive to the downward movement of said basket relative to said tub when said basket is filled with liquid to the overflow level, and a diaphragm operated switch contained within said well and arranged for actuation by the head of water within said well when said well walls are extended and for release when said walls are contracted, and circuit means interconnecting said switch, said drive mechanism and said filling means for terminating the filling operation and activating the drive mechanism upon operation of said switch.

8. In a washing machine, a substantially imperforate wash basket spring suspended within an enclosing tub, drive means for providing washing action within said basket and for rotating said basket for liquid extraction, overflow means for discharging liquid from said basket into said tub, means continuously effective during operation of said drive means for disposing of liquid within said tub, liquid fill means for said basket, a timer, switch means sequentially operated by said timer controlling said drive means and said fill means, a liquid level switch fixed with respect to the tub having a first position enabling said liquid fill means and disabling said drive means and a second position enabling said drive means and disabling said fill means, means for conditioning said liquid level switch for operation from said first position to said second position dependent upon the weight of the basket and its contents including both clothes and liquid, and means for operating said switch when so conditioned in response to a predetermined liquid level within the tub resulting from basket overflow.

9. In an automatic washing machine of the type having a substantially imperforate spring suspended basket rotatably mounted within a stationary tub with means for agitating clothes placed within said basket and liquid fill means for said basket, and overflow means for discharging liquid from said basket into said tub, means for preventing agitation unless an adequate liquid supply is available within said basket, said last mentioned means comprising a switch carried by the tub, conditioning means for conditioning said switch for operation dependent on movement of the spring suspended basket responsive to weight of liquid and clothes placed therein, and switch operating means responsive to liquid level within said tub resulting from basket overflow for operating said switch after it has been conditioned for operation by said conditioning means.

10. An automatic clothes washer comprising an outer tub, a spin basket resiliently mounted within said tub, agitation means within said basket for providing washing action, fill means for said basket, drive means for said agitation means and for rotating said basket at high speed, time control means for said fill means and said drive means to provide the desired sequence of operations, said time control means including an agitate circuit for effecting operation of agitation means, and means preventing agitation when said basket is in an unfilled condition, said last mentioned means comprising a tub mounted switch connected in series circuit relation in said agitate circuit first conditioning means for conditioning said switch for operation in response to a minimum weight of basket and liquid contents thereof, and second conditioning means for actuating said switch after the conditioning thereof in response to a predetermined overflow of liquid into said tub, whereby switch actuation to close said agitate circuit requires both minimum basket weight and presence of liquid in said tub.

References Cited in the file of this patent
UNITED STATES PATENTS

| | | |
|---|---|---|
| 2,381,894 | Ferris | Aug. 14, 1945 |
| 2,552,823 | Tea | May 15, 1951 |
| 2,554,672 | Johnston | May 29, 1951 |
| 2,561,257 | Woodson | July 17, 1951 |
| 2,645,915 | Rand | July 21, 1953 |